United States Patent [19]

Verbeski

[11] Patent Number: 5,265,909
[45] Date of Patent: Nov. 30, 1993

[54] SEAT BELT ANCHORAGE SYSTEM FOR CONVERSION VAN

[75] Inventor: Andrew Verbeski, Milwaukee, Wis.

[73] Assignee: The Compliance Group, Milwaukee, Wis.

[21] Appl. No.: 771,624

[22] Filed: Oct. 4, 1991

[51] Int. Cl.$^5$ ............... B60R 22/22; B60R 22/24; B60R 22/26
[52] U.S. Cl. .................... 280/808; 296/65.1
[58] Field of Search ............... 296/68.1, 63, 65.1; 280/808, 801, 802; 297/468, 483; 248/903

[56] References Cited

U.S. PATENT DOCUMENTS

| | | | |
|---|---|---|---|
| 2,898,976 | 8/1959 | Barecki | 297/481 |
| 3,617,087 | 11/1971 | Hiramatsu . | |
| 4,025,110 | 5/1977 | Poorman . | |
| 4,331,349 | 5/1982 | Funahashi | 280/801 |
| 4,480,867 | 11/1984 | Ezell | 296/65.1 |
| 4,685,716 | 8/1987 | Kondo . | |
| 5,020,856 | 6/1991 | George | 280/808 |
| 5,106,121 | 4/1992 | Boone | 280/808 |

FOREIGN PATENT DOCUMENTS

| | | | |
|---|---|---|---|
| 60-154936 | 8/1985 | Japan | 280/803 |
| 61-24628 | 2/1986 | Japan | 296/65.1 |
| 62-299450 | 12/1987 | Japan | 280/801 |

Primary Examiner—Karin L. Tyson
Attorney, Agent, or Firm—Nilles & Nilles

[57] ABSTRACT

This invention relates to a seat belt anchorage system for a conversion van. The system includes reinforcement of the upper frame rails of the van and includes seat belt bars connected to the floor of the van. The seat belt bars are attached to frame locking reinforcement members beneath the floor, which in turn engage the chassis frame rails of the van. Seat belt and shoulder harness assemblies are connected to the reinforcements on the upper frame rails and to the seat belt bars. In response to crash forces imposed on the seat belts, the components of the system simultaneously transmit the crash forces to the chassis frame, strengthen weak points at the upper frame rails and in the rear fenderwells of the vehicle, and distribute forces applied to the seat belts throughout the vehicle frame.

16 Claims, 9 Drawing Sheets

SEAT BELT ANCHORAGE SYSTEM FOR CONVERSION VAN

BACKGROUND OF THE INVENTION

1. Field of the Invention

This invention relates to a seat belt anchorage system for a conversion van. More particularly, this invention relates to a seat belt anchorage system itself, to a conversion van which includes a seat belt anchorage system, and to a method of installing a seat belt anchorage system in a conversion van.

2. Background of the Related Art

A van conversion vehicle is first manufactured as an incomplete vehicle by an automotive chassis manufacturer. The term incomplete vehicle refers to a vehicle which is mechanically a full functioning vehicle, but it has no interior components. The incomplete vehicle has no seat belt anchorages except for the two front seat belts and shoulder harnesses. Incomplete vehicles are manufactured by General Motors, Ford Motor Company and Chrysler Corporation.

The second stage manufacturer, or conversion company, installs the interior components to complete the vehicle, including an audio system, wheels, trim, upholstery, seating, wood finishes and electrical components. It is the responsibility of the conversion company to install the interior and modify the vehicle, particularly with respect to seat belts, in accordance with Federal Motor Vehicle Safety Standards (FMVSS).

FMVSS Standard No. 207, which relates to seating systems for passenger vehicles, including vans, establishes minimum safety requirements for seats, their attachment assemblies, and their installation, to minimize the possibility of failure as a result of forces acting on the seat in the event of vehicle impact. FMVSS Standard No. 210, which relates to seat belt anchorages for passenger vehicles, including vans, specifies the minimum safety requirements for seat belt assembly anchorages to ensure effective occupant restraint and to reduce the likelihood of failure in a collision.

FMVSS Standard No. 207 requires that each occupant seat withstand certain forces when tested in accordance with established test procedures. These forces include 20 times the weight of the seat applied in a forward longitudinal direction and a force that produces a 3,300 inch-pound moment about the seating reference point. In addition, if a seat belt assembly is attached to the seat, the seat must withstand a force of 20 times the weight of the seat applied simultaneously with a force imposed on the seat by the seat belt assembly when loaded in accordance with FMVSS Standard No. 210.

The weight of the seat assembly in most cars consists almost entirely of the seat pan, the seat back, and the seat adjuster. The fixed portion of the seat assembly that is fastened to the floor of the car contributes only a minor portion to the overall weight of the seat assembly. Special difficulties have arisen, though, when the FMVSS 207 testing procedures have been applied to pedestal seats of the kind used in many trucks and recreational vehicles, including those used in conversion vans.

A pedestal seat consists of a seat mounted on a seat adjuster, which in turn is attached to the top of a pedestal. In this application, the seat belt assembly is typically attached to the pedestal. The difficulties with testing a pedestal seat arise from its unusual weight distribution. In some cases, close to half of the weight of the assembly is in the pedestal. A similar weight distribution problem occurs with sofa-type or bench-type seats often located at the rear of a van. Because the unusual weight distribution, manufacturers were testing the seats separately from the pedestal.

A conversion van typically has a pair of mid-position captains-type chairs (one on the driver's side and one on the passenger side), and a sofa seat at the rear of the vehicle. The seat belt assembly on a captain's chair has been typically attached to the seat pedestal, and the pedestal has been merely bolted to the floor. The seat belt assemblies for the rear sofa seat have typically been attached to a seat belt bar which extends across the floor of the vehicle behind the sofa seat. The sofa seat belt bar has ordinarily been bolted to the floor of the van.

NHTSA recently tested the seat belt assembly anchorages on conversion vans from three conversion companies. All three vans tested failed. Two of the vans tested utilized seat belt bars to anchor the seat belts on the rear sofa seat. In each instance the seat belt bar was substantially deformed and pulled completely out of the floor when the test force was applied. A mid-position captain's chair in one van failed when the pedestal broke in two, causing the test to be aborted before the full load could be applied. In testing other pedestal seats in the vans, it was noted that, while the seats did not break loose, nevertheless they bent all the way forward so as to possibly endanger the occupants when coming in contact with rigid parts of the vehicle.

The tests conducted by NHTSA revealed several shortcomings in the current practice of anchoring seat belts in conversion vans. Testing of the seating components such as the seats, pedestals and seat belts has previously been conducted on an individual component basis and the tests have been run on a non-yielding testing apparatus. The test results under such laboratory conditions may bear no relation to those which would be found in actual vehicle applications. Moreover, van converters typically used the test data from the individual component manufacturers to determine whether a combination of components complied with the federal standards. That is, a seat, a pedestal, and a seat belt which may have been individually certified as being in compliance with federal standards, have been assumed by the van converter to also be in compliance when installed as a combination in a van conversion vehicle. The total seating system has previously not been tested for compliance.

Furthermore, the seat belt angle changes with the interchange of seating components. The intent of FMVSS Standard No. 210 is to have the lap belt distribute the crash load to the pelvis of the occupant. FMVSS Standard No. 210 currently requires the seat belt angle to be not less than 20° nor more than 75°, and a change in the standard effective in 1992 will require the seat belt angle to be not less than 30° nor more than 75°. NHTSA found in some conversion vans, however, that the seat combination actually had an effective angle of up to 90°. When the seat belt angle exceeds 75°, the belt will load the legs rather than the pelvis, causing more serious injury. Furthermore, a seat belt with an effective angle near 90° will not properly restrain a child safety seat.

Finally, an occupant of a pedestal seat may be endangered during a crash because the occupant and the seat may rotate forward and come in contact with rigid parts of the vehicle.

In response to the shortcomings disclosed by its testing, NHTSA recently amended FMVSS Standard No. 207 by prescribing new test procedures for pedestal seats that NHTSA believes more closely represent the load distribution actually experienced by pedestal seats in real world crashes. FMVSS Standard No. 207 now requires a single test for pedestal seats which simultaneously applies two loads. A first load of 20 times the weight of the upper seat is applied horizontally through the center of gravity of that portion of the seat. Simultaneously, a second load of 20 times the weight of the pedestal is applied horizontally through the pedestal's center of gravity. If the seat belt is mounted on the seating system, the load required under FMVSS Standard No. 210 is applied at the same time.

SUMMARY OF THE INVENTION

A seat belt anchorage system for a conversion van capable of withstanding the forces experienced in a real world crash, and more particularly, capable of withstanding the forces required by FMVSS Standard Nos. 207 and 210, is disclosed. The invention disclosed below relates to a seat belt anchorage system itself, to a conversion van which includes a seat belt anchorage system, and to a method for installing a seat belt anchorage system on a conversion van.

The system is designed so that forces applied to a seat assembly are transmitted to the frame of the vehicle. Individual components of the system serve the function of transmitting a force applied against the seat assembly to the vehicle frame, or distributing the force over an extended part of the vehicle, or strengthening a weak point in the vehicle, or a combination of these functions.

The system includes reinforcement of the upper frame rails of the van and includes seat belt bars connected to the floor of the van. The seat belt bars are attached to frame locking reinforcement members beneath the floor, which in turn engage the chassis frame rails of the van. Seat belt and shoulder harness assemblies are connected to the reinforcements on the upper frame rails and to the seat belt bars. In response to crash forces applied to the seat belts, the components of the system simultaneously transmit vehicle crash forces to the chassis frame, strengthen at the upper frame rails and the rear fenderwells of the vehicle, and distribute forces applied to the seat belts throughout the vehicle frame.

The system is adapted for installation on incomplete vehicles supplied by General Motors, Ford and Chrysler, including GM mini-vans. The system is compatible with seat pedestals, captain's chairs, sofa seats, and seat belt assemblies readily available and used throughout the conversion industry. This systems is designed to accommodate either type 1 (lap belt only) or type 2 (lap belt and shoulder harness combination) seat belts. The system is designed for either original installation on conversion vans utilizing either type 1 or type 2 seat belts, or for retrofitting conversion vans having type 1 seat belts which are already in the field.

The primary objects of the invention are therefore to provide a seat belt anchorage system for a conversion van capable of withstanding the forces experienced in a real world crash; to provide a system which will comply with the testing procedures of FMVSS Standard Nos. 207 and 210; to provide a system in which the forces applied to a seat assembly are transmitted to the frame of the vehicle; to provide a system in which the forces applied to a seat assembly are distributed over extended portions of the vehicle; to provide a system which strengthens weak points in the vehicle; to provide a system adaptable for use on frame chassis supplied by several manufacturers; to provide a system which utilizes several commercially available components; and to provide a system which is adaptable to either original installations or retrofit applications.

Other objects and advantages of the invention will become apparent from the following description which, taken in connection with the accompanying drawings, set forth by way of illustration and example certain embodiments of this invention.

BRIEF DESCRIPTION OF THE DRAWINGS

The drawings, which constitute part of the specification and include exemplary embodiments of the invention for a Chevrolet chassis as shown in FIGS. 1-6 and for a Ford chassis as shown in FIGS. 7-14, include the following.

DETAILED DESCRIPTION

Figure 1:
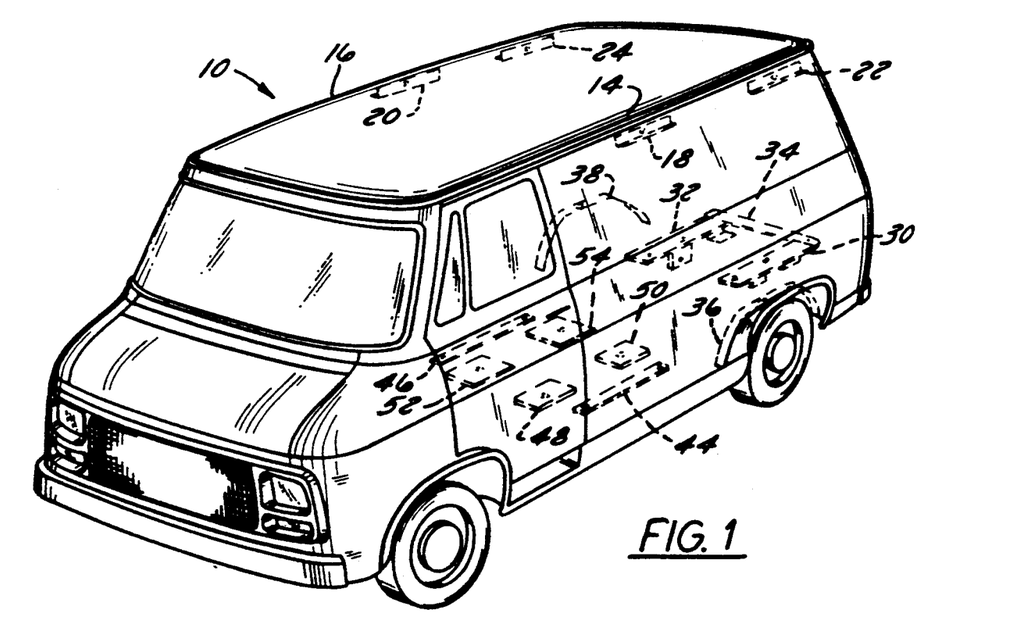
FIG. 1, is a perspective view of a van showing the reinforcing components of the invention and their location on the van.
Figure 2:
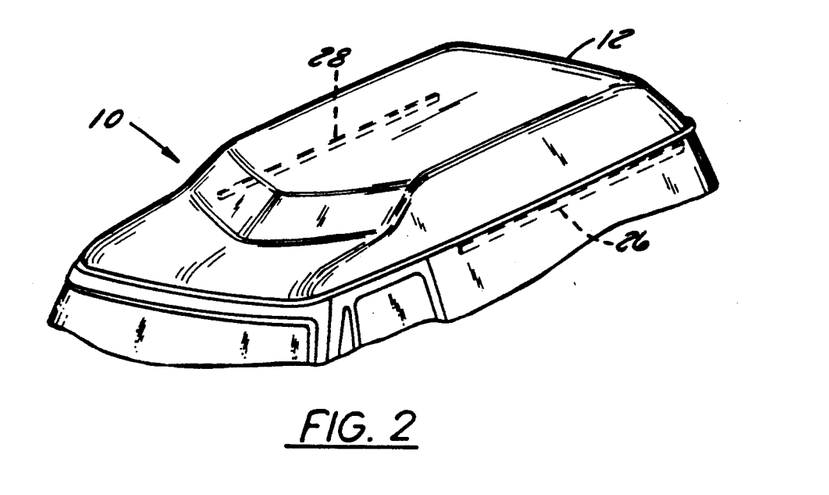
FIG. 2, is a partial perspective view of a van similar to that shown in FIG. 1 but having a raised roof and showing the location of corresponding upper frame rail reinforcements.

FIGS. 1 and 3-6 show a seat belt anchorage system according to the invention as installed on a Chevrolet full sized conversion van 10. FIG. 2 shows a modification of the invention for a Chevrolet van having a raised roof 12.

Figure 3:
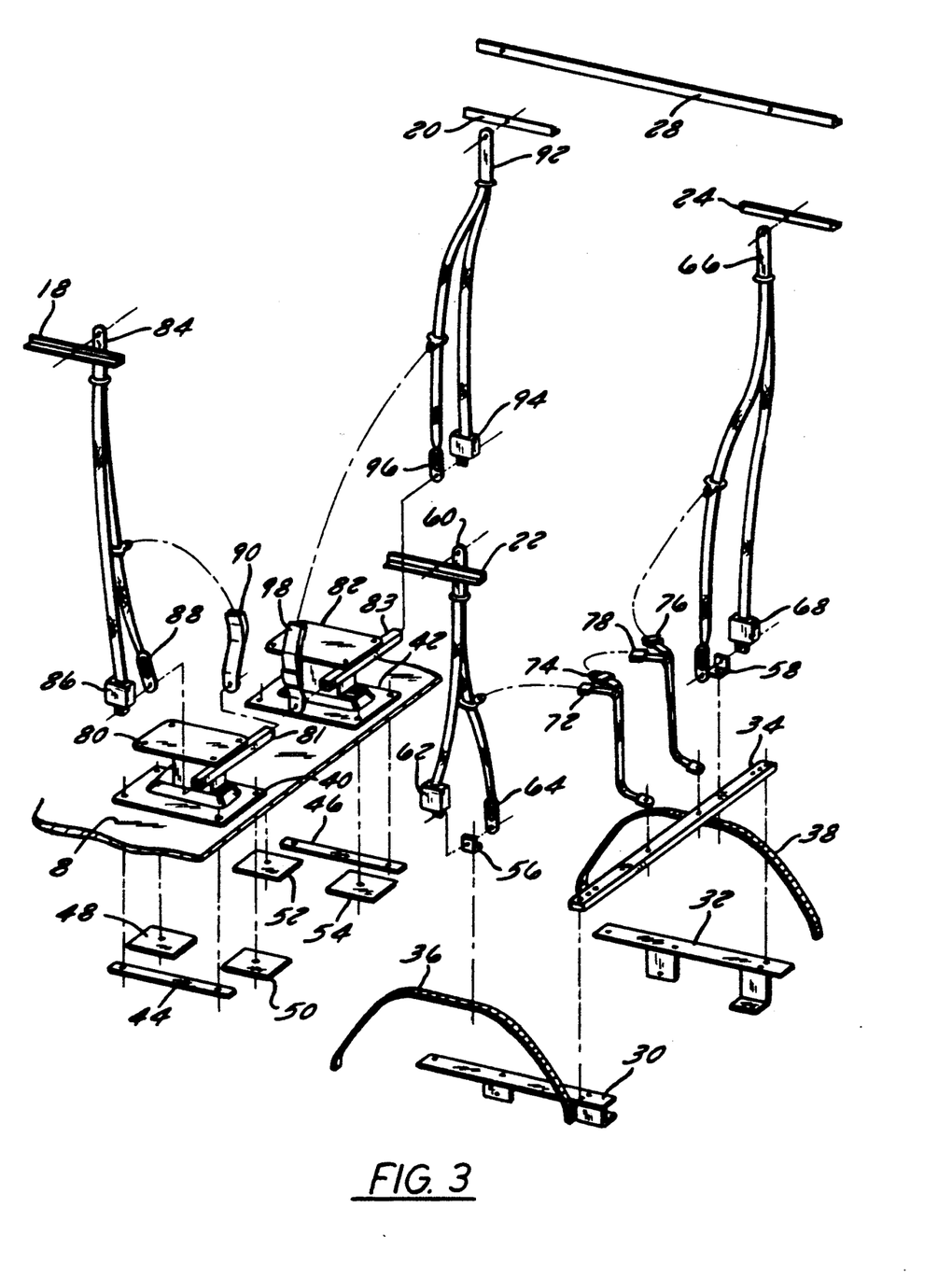
FIG. 3, is an exploded perspective view of the seat belt and shoulder harness assemblies and the components of the anchorage system for the van shown in FIG. 1.
Figures 4, 5:
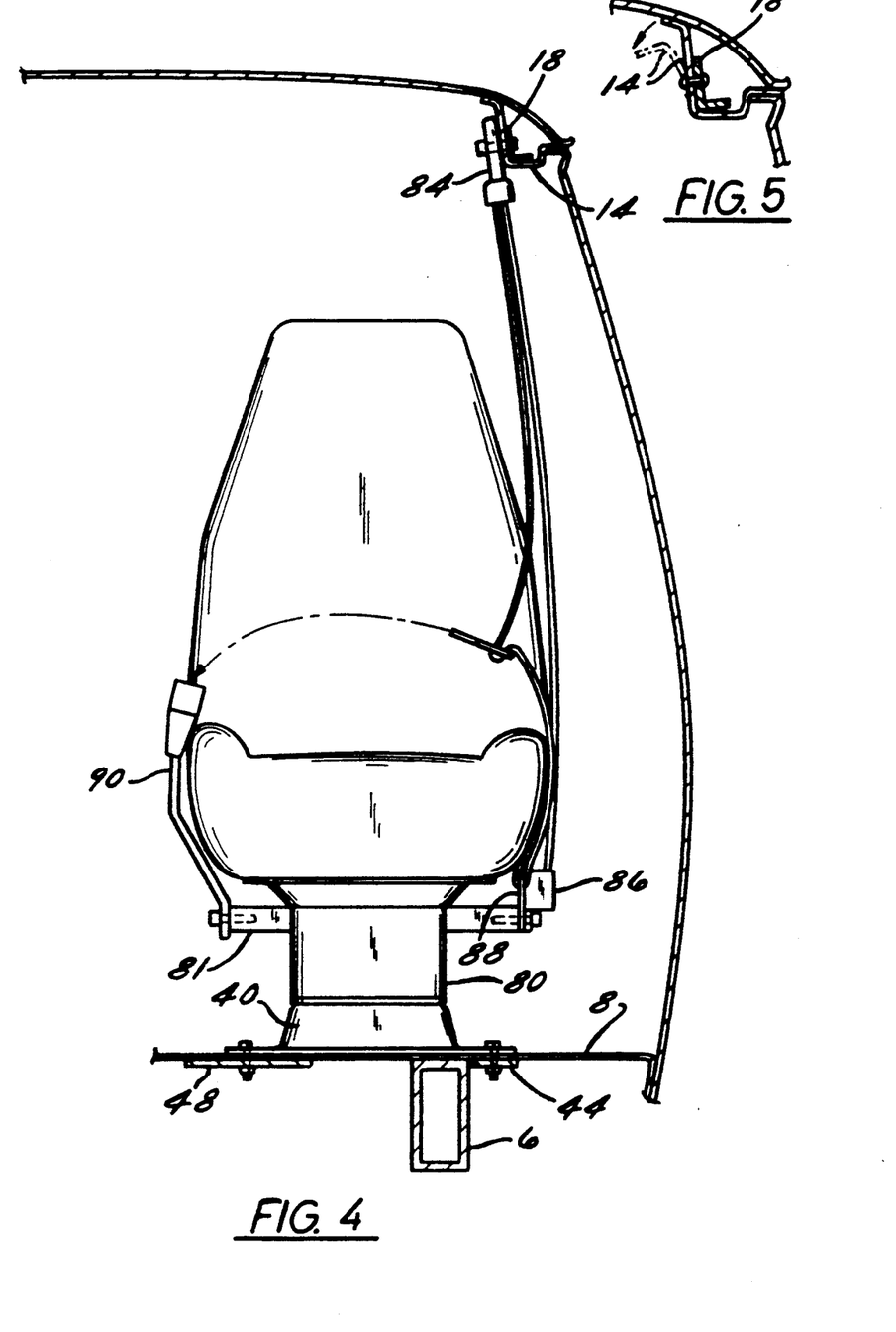
FIG. 4, is a partial sectional view of the let mid-section of the van shown in FIG. 1, showing the mid-position captain's chair on the driver's side of the vehicle.
FIG. 5, is an enlarged view of the upper frame rail shown in FIG. 4, showing the bending of the frame rail necessary to install the reinforcements therein.

In a van, upper frame rails 14 and 16 extend from the front to the rear along the upper side edge of the passenger vehicle compartment. The upper frame rails 14 and 16 are reinforced with upper harness attachment bolt bars. Each bolt bar is made from an elongated metal angle member having a bolt hole for fastening a corresponding upper harness attachment to it. Referring to FIGS. 1 and 3, an upper harness attachment bolt bar is connected at the mid-position 18 and rear-position 22 of the driver side upper frame rail 14, and at the mid-position 20 and rear-position 24 of the passenger side upper frame rail 16. In the full size van 10, a separate upper harness attachment bolt bar is installed at each position as shown in FIG. 1. For a high top van 12, a single upper harness attachment bolt bar 26 extending across both the mid- and rear-positions, is placed on the driver's side upper frame rail 14, and a single upper harness attachment bolt bars 28 extending along both the mid- and rear-positions is installed in the passenger side upper frame rail 16. As shown in FIG. 5, the upper harness attachment bolt bars are installed behind the upper frame rails by using a duck-bill pliers to bend down the upper beam edges of the upper frame rails to allow the bolt bars to slip behind the rails. After the bolt bars are installed, the beam edges are pounded back into place with a rubber mallet.

Figure 6:
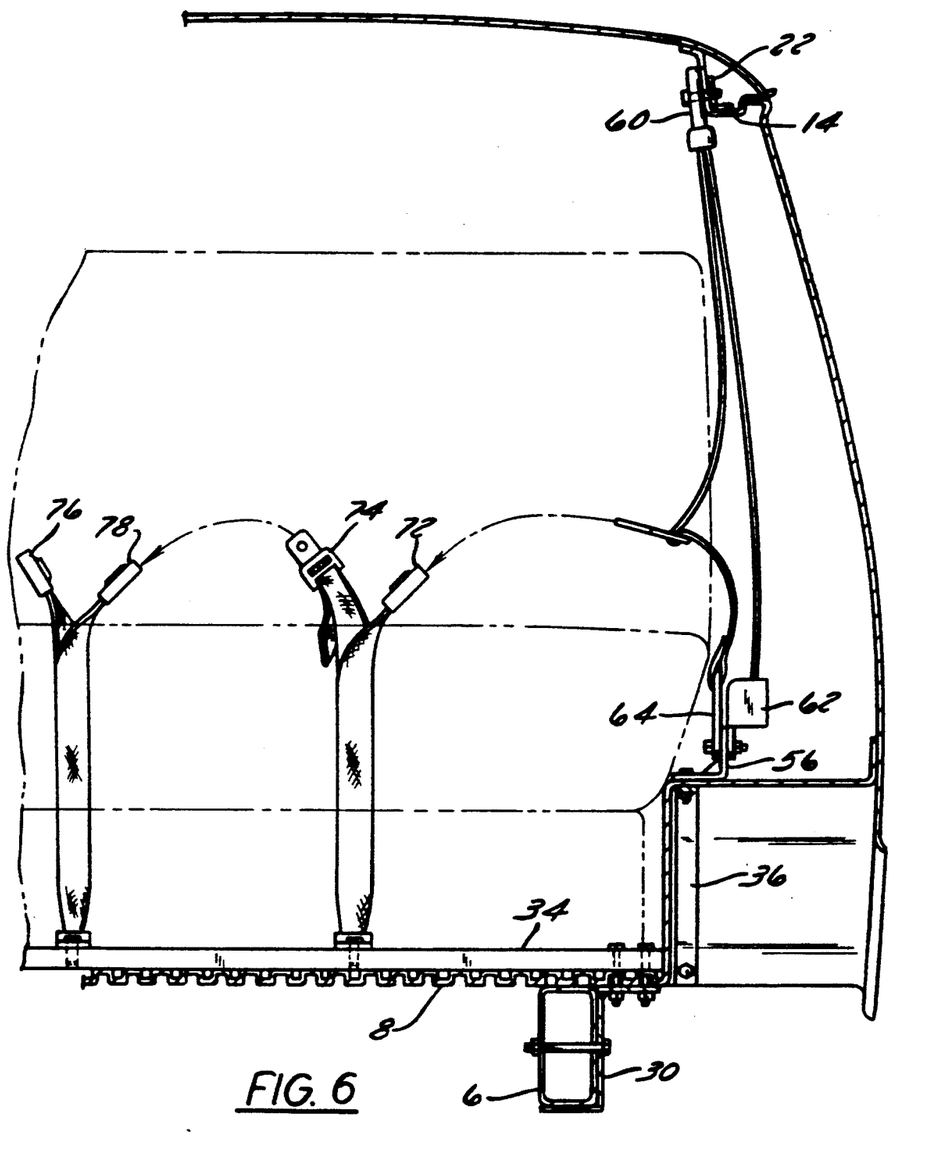
FIG. 6, is a partial sectional view of the rear drivers side section of the van shown in FIG. 1.

Frame locking sofa reinforcement members 30 and 32 are connected beneath the rear portion of the floor 8 adjacent the driver side chassis frame rail 6 and adjacent the passenger side chassis frame rail. Each sofa reinforcement member 30 and 32 comprises an elongated metal plate-like portion which is bolted against the underside of the floor 8, and includes at the rear portion of the member a downward extending angled flange section which extends from the flat plate-like portion downward and wraps around the underside of the chassis frame rail, and includes at the forward portion of the member a downward extending tab having a bolt hole for bolting the sofa reinforcement member to the chassis frame rail.

A sofa seat belt bar 34 is laid across the rear portion of the top side of the floor 8, extending from the left to the right side of the van. The sofa seat belt bar 34 is made from a relatively thick, elongated metal bar. The sofa seat belt bar 34 is bolted to the rear portions of the driver side and passenger side sofa reinforcement members 30 and 32.

After a hole is drilled in the top of each rear fenderwell, a fenderwell reinforcement strap is slipped into place and connected to the underside of the fenderwells. A fenderwell reinforcement strap 36 is placed in the driver side rear fenderwell, and another strap 38 is placed in the passenger side rear fenderwell. Each fenderwell reinforcement straps 36 and 38 is forced up into the fenderwell as far as possible, and then each end of the strap is bolted to the side of the fenderwell.

A pedestal base 40 is positioned on the top of the floor 8 at the driver side mid-position and another base 42 is positioned at the passenger side mid-position. An elongated metal outboard reinforcing plate 44 is bolted from beneath the floor to the two outward corner bolt holes of the pedestal base 40 located at the driver side mid-position, and another outboard reinforcing plate 46 is bolted to the outboard corner bolt holes of the pedestal base 42 at the passenger side mid-position.

The driver side outboard reinforcing plate 44 is positioned so that its inboard edge abuts up against the side of the chassis frame rail 6 and is engaged underneath an outward extending lip of the chassis frame rail as shown in FIG. 4. The passenger side reinforcing plate is similarly placed underneath the lip of the chassis frame rail on the passenger side of the van. Rectangular metal inboard reinforcing plates are bolted from beneath the floor to the front 48 and rear 50 inboard bolt holes of the pedestal base 40 located at the driver side mid-position, and to the front 52 and rear 54 inboard bolt holes of the pedestal base 42 located at the passenger side mid-position.

Moving to the rear of the vehicle, a harness L bracket 56 is placed on the top of the driver side rear fenderwell and bolted through to the corresponding fenderwell reinforcement strap 36 underneath. Another harness L bracket 58 is likewise placed on top of the passenger side rear fenderwell and bolted through to the corresponding fenderwell reinforcement strap 38 underneath there.

Each seat belt assembly for the outboard rear seat positions consists of a type 2 three-point belt kit having two portions to it. The first portion is a harness assembly which comprises a seat belt retractor, an upper harness attachment, an anchor plate, and a buckle, with a seat belt web threaded through all four components. The second portion consists of a buckle receptor assembly.

At the driver side rear seating position, an upper harness attachment 60 is bolted to the upper harness bolt bar 22 previously installed in the rear position of the driver side upper frame rail 14. The corresponding harness retractor 62 and anchor plate 64 are bolted to the harness L bracket 56 on the driver side rear fenderwell. Similarly, for the rear passenger seating position, an upper harness attachment 66 is bolted to the upper harness bolt bar 24 at the rear position of the passenger side upper frame rail 16. The corresponding harness retractor 68 and anchor plate 70 are bolted to the harness L bracket 58 on the passenger side rear fenderwell. The rear seat belt installations are completed by bolting the buckle receptor assembly 72 and one half of the center seat belt 74 to the driver side, inboard point on the sofa seat belt bar 34. The other buckle receptor assembly 76 and the second half of the center seat belt 78 are bolted to the passenger side inboard point of the sofa seat belt bar 34.

Moving to the captain's chairs, a seat pedestal 80 is attached to the pedestal base 40 at the driver side mid-position, and a seat pedestal 82 is attached to the pedestal base 42 located at the passenger side mid-position. Each seat pedestal 80 and 82 has a seat belt bar 81 and 83 mounted on the upper rear portion of the pedestal 80 and 82. Each seat belt bar 81 and 83 is effectively connected to the floor 8 by virtue of it being an integral part of a pedestal 80 or 82, which in turn is attached to a pedestal base 40 or 42 connected to the floor.

Each seat belt assembly on the captain's chairs likewise has two portions to it—a harness assembly which includes a retractor, upper harness attachment, anchor plate and buckle with a seat belt web wound through each point, and a corresponding buckle receptor assembly. An upper harness attachment 84 is bolted to the upper harness bolt bar 18 previously installed at the mid-position of the driver side upper frame rail 14. The corresponding harness retractor 86 and anchor plate 88 is bolted to the outboard side of the pedestal-mounted seat belt bar 81 located on the driver side mid-position pedestal 80. A buckle receptor 90 is bolted to the inboard side of the pedestal-mounted seat belt bar 81 located on the driver side mid-position pedestal 80.

An upper harness attachment 92 is similarly bolted to tho upper harness bolt bar 20 at the mid-position of the passenger side upper frame rail 16, and the corresponding harness retractor 94 and anchor plate 96 are bolted to the outboard side of the pedestal-mounted seat belt bar 83 on the passenger side mid-position pedestal 82. A buckle receptor 98 is bolted to the inboard side of pedestal-mounted seat belt bar 83 located on the passenger side mid-position pedestal 82.

Figure 7:
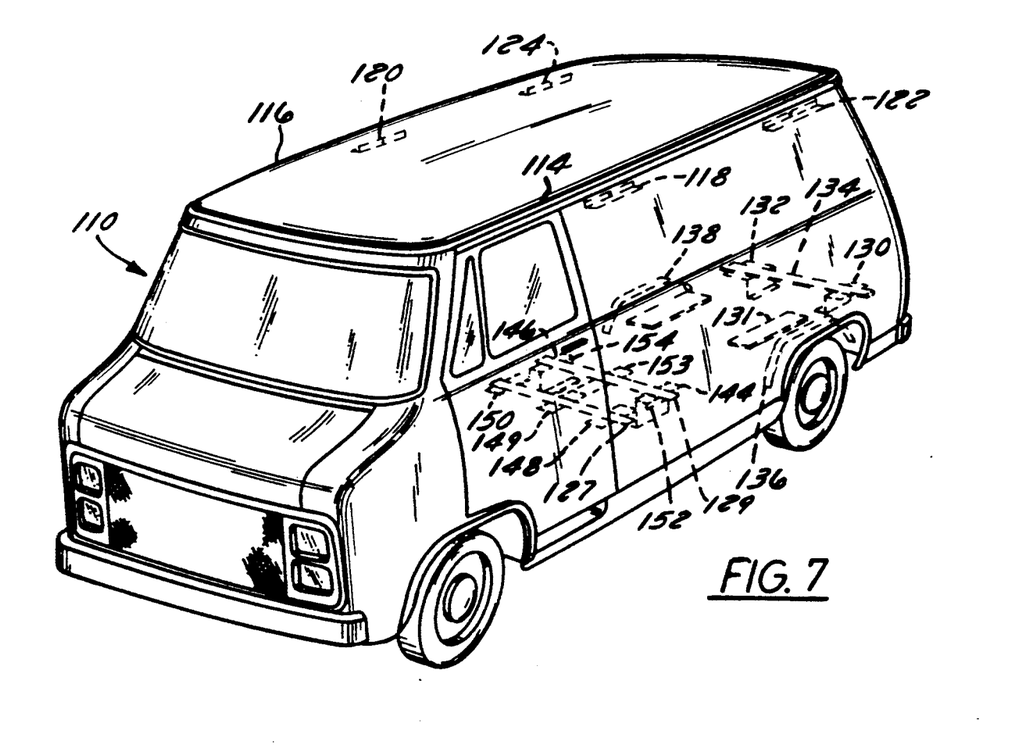
FIG. 7, is a perspective view of a van showing the reinforcing components of the invention and their location on the van.
Figure 8:
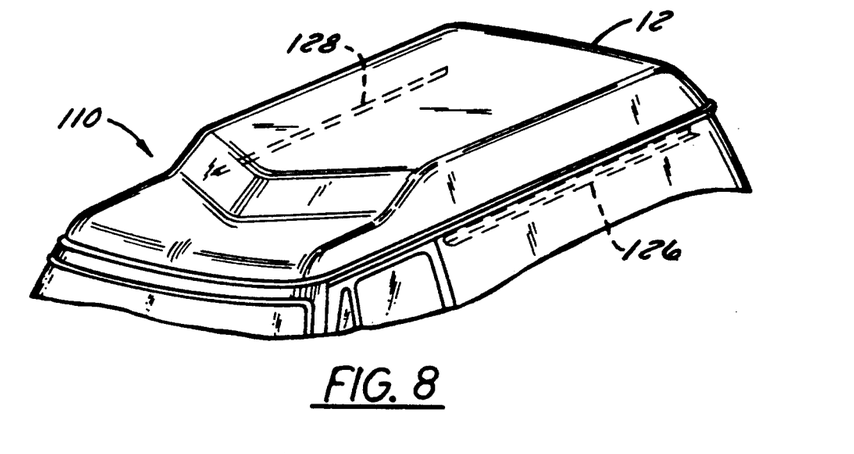
FIG. 8, is a partial perspective view of a van similar to that shown in FIG. 7 but having a raised roof and showing the location of corresponding upper frame rail reinforcements.

FIGS. 7 and 9-14 show a seat belt anchorage system according to the invention as installed on a Ford full size van 110. FIG. 8 shows a modification of the system for installation on a Ford high top van 112. The system installed on a Ford van is comparable to the system installed in a Chevrolet van, although certain modifications of the system are required due to the different chassis frame on a Ford and different specifications of the manufacturer.

Figure 9:
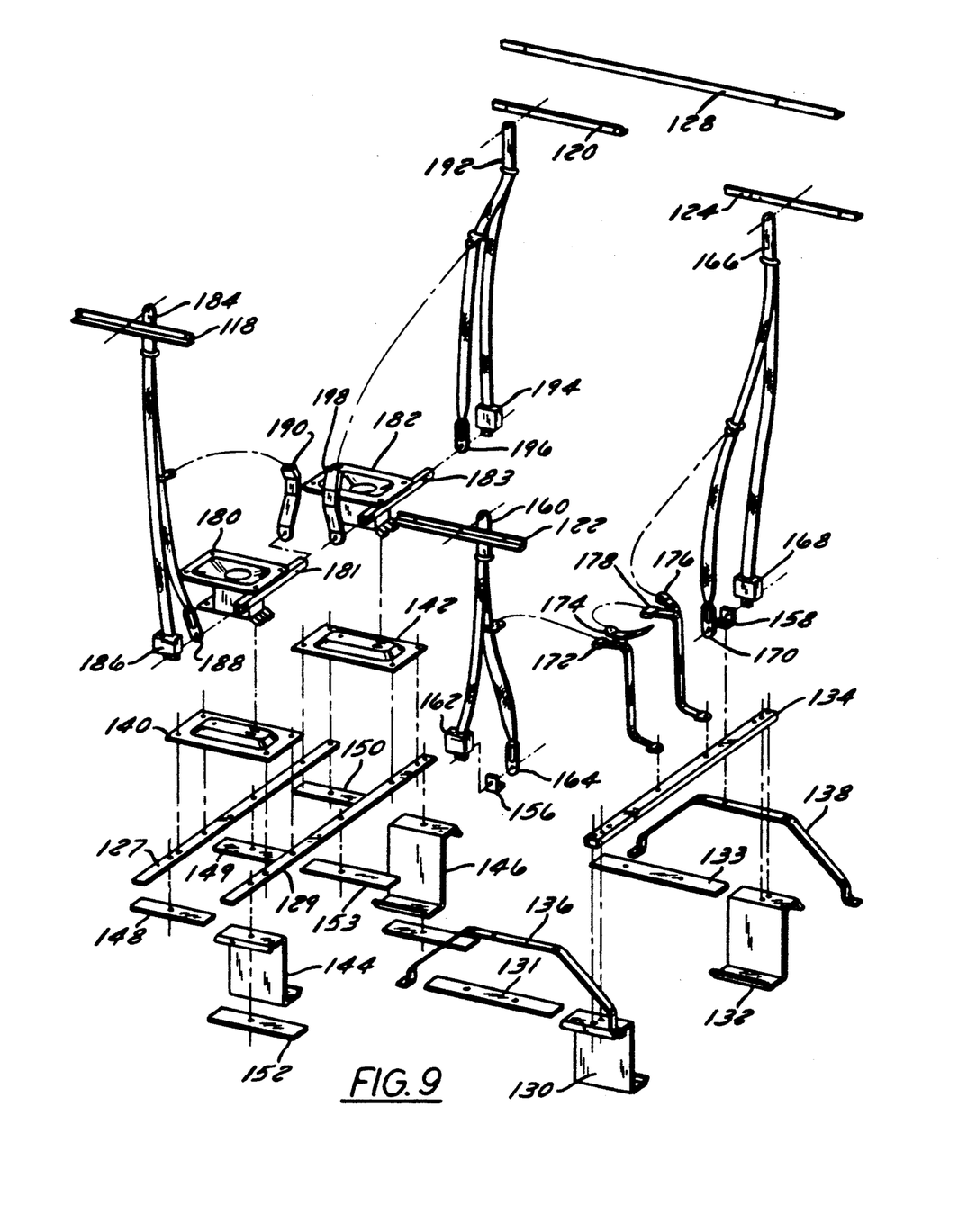
FIG. 9, is an exploded view of the seat belt and shoulder harness assemblies and the components of the anchorage system for the van shown in FIG. 7.

Upper harness attachment bolt bars are installed in the upper frame rails at the mid-position 118 and rear-position 122 of the driver side upper frame rail 114, and installed at the mid-position 120 and rear-position 124 of the passenger side upper frame rail 116. Each upper harness attachment bolt bar comprises an elongated metal angle member having a bolt hole for connecting the upper harness attachments. A separate upper harness attachment bolt bar is installed at each seating position on the standard roof model as shown in FIG. 7. In the raised roof model, one long upper harness attachment bolt bar 126 is installed in the driver side upper frame rail 114 and extends across both the mid and rear seating positions. Also, one upper harness attachment bolt bar 128 is placed in the passenger side upper frame rail 116 and extends across both the mid and rear seating positions. The upper harness attachment bolt bars are slipped behind the upper frame rail by using a duck-bill pliers to bend the top part of the upper frame rail downward, slipping the bolt bars behind it, then pounding the beam edge back into place with a rubber mallet.

At the mid-section of the interior of the van, a front pedestal bar 127 and a rear pedestal bar 129 are placed on the floor 108, each bar extending across the width of the floor of the van. At the rear of the vehicle, a sofa seat belt bar 134 spans the width of the rear portion of the floor 108 of the van. Seat belt bars may be installed below as well as above the floor of the van.

Figure 12:
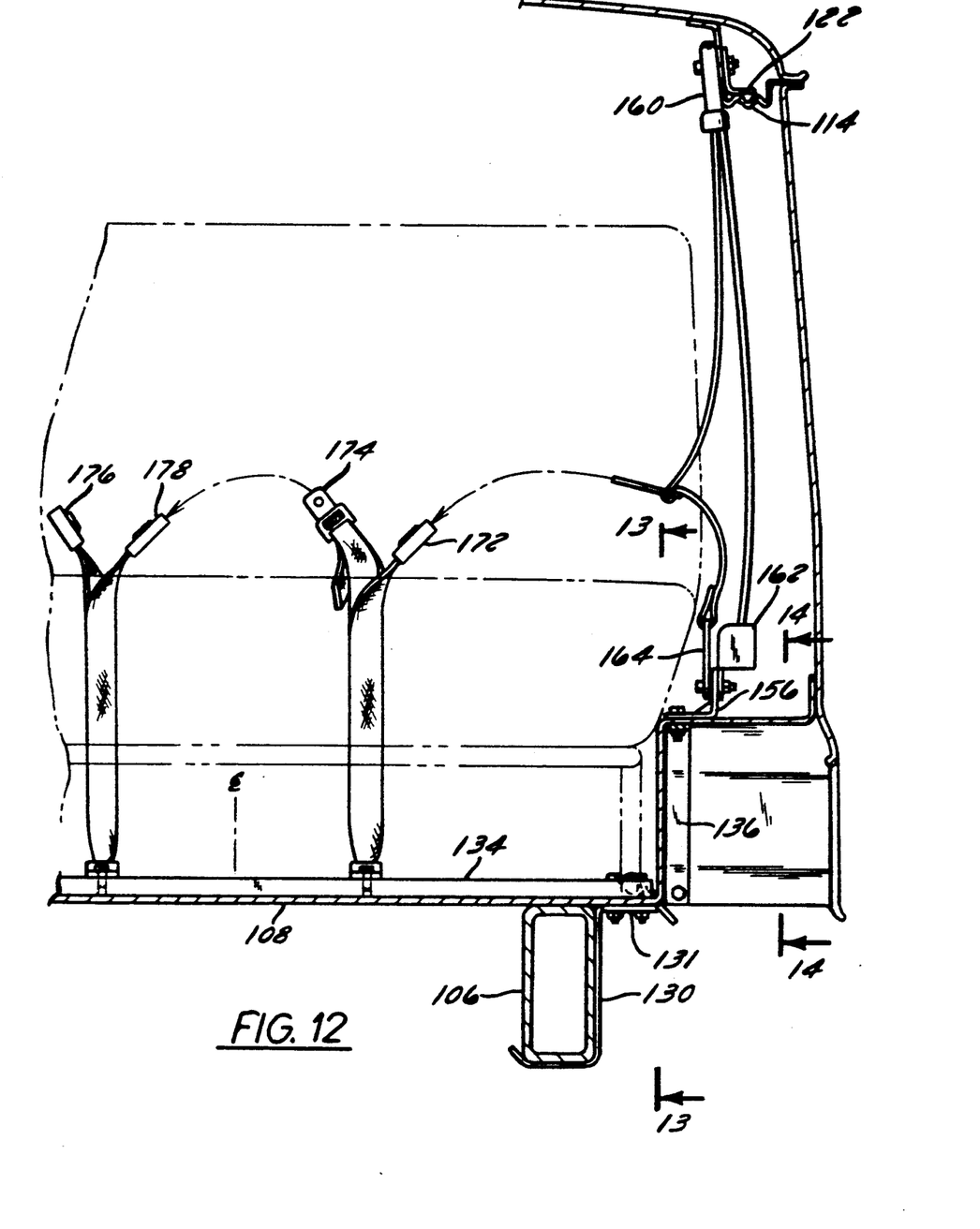
FIG. 12, is a partial sectional view of the rear driver's side section of the van shown in FIG. 7.
Figure 13:
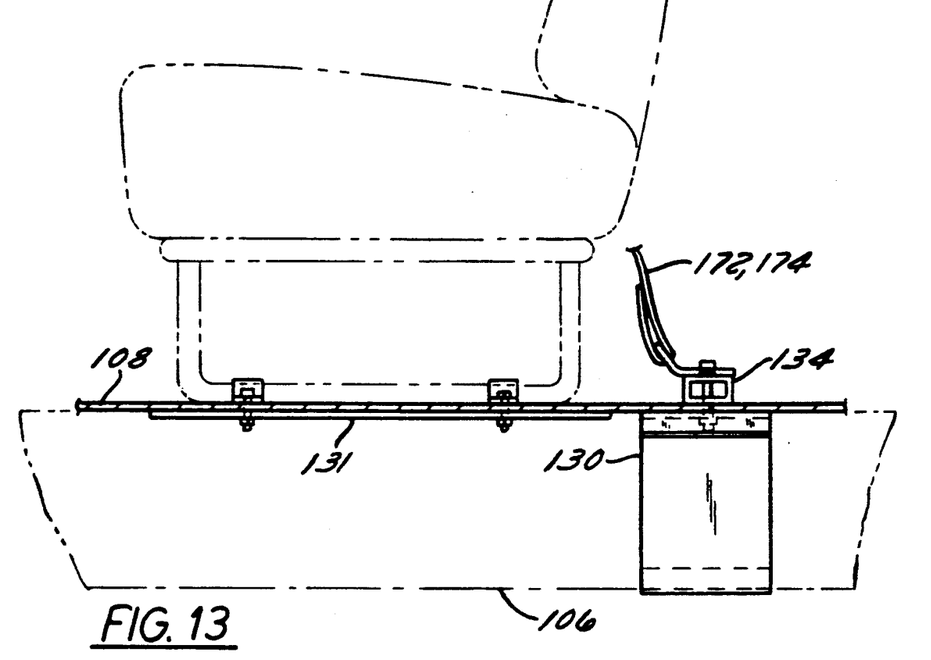
FIG. 13, is a sectional view at line 13—13 of FIG. 12.
Figure 14:
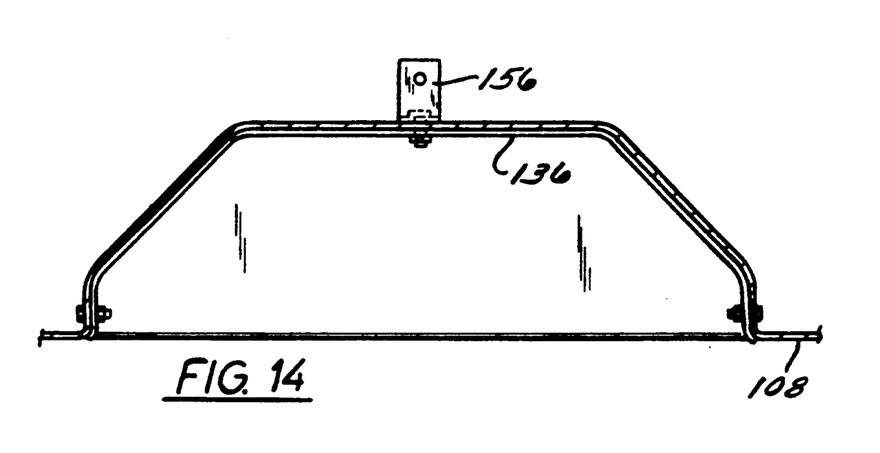
FIG. 14, is a sectional view at line 14—14 of FIG. 12.

Moving beneath the vehicle, a rear frame locking sofa reinforcement member 130 is bolted from beneath the floor 108 to the driver end of the sofa seat belt bar 134, and another rear frame locking sofa reinforcement member 132 is bolted to the passenger end of the sofa seat belt bar 134. Each rear frame locking sofa reinforcement member 130 and 132 comprises an upper flat metal section which has two bolt holes for bolting it to the sofa seat belt bar 134, has a vertical section extending downward adjacent the chassis frame rail 106, and has a lower horizontal flat section which wraps around the underside of the chassis frame rail. Each rear frame locking sofa reinforcement member 130 and 132 fits snugly around the chassis frame without touching it. Upon application of forces experienced in a crash or the forces applied in a test under federal standards, the rear frame locking sofa reinforcement members 130 and 132 engage and lock against the chassis frame rails. A conversion company may also coat the inside of the rear frame locking sofa reinforcement members 130 and 132 with rubber or foam tape, and the rubber or foam may contact the chassis frame rails so long as it does not place a load on the frame under normal operating conditions.

Figures 10, 11:
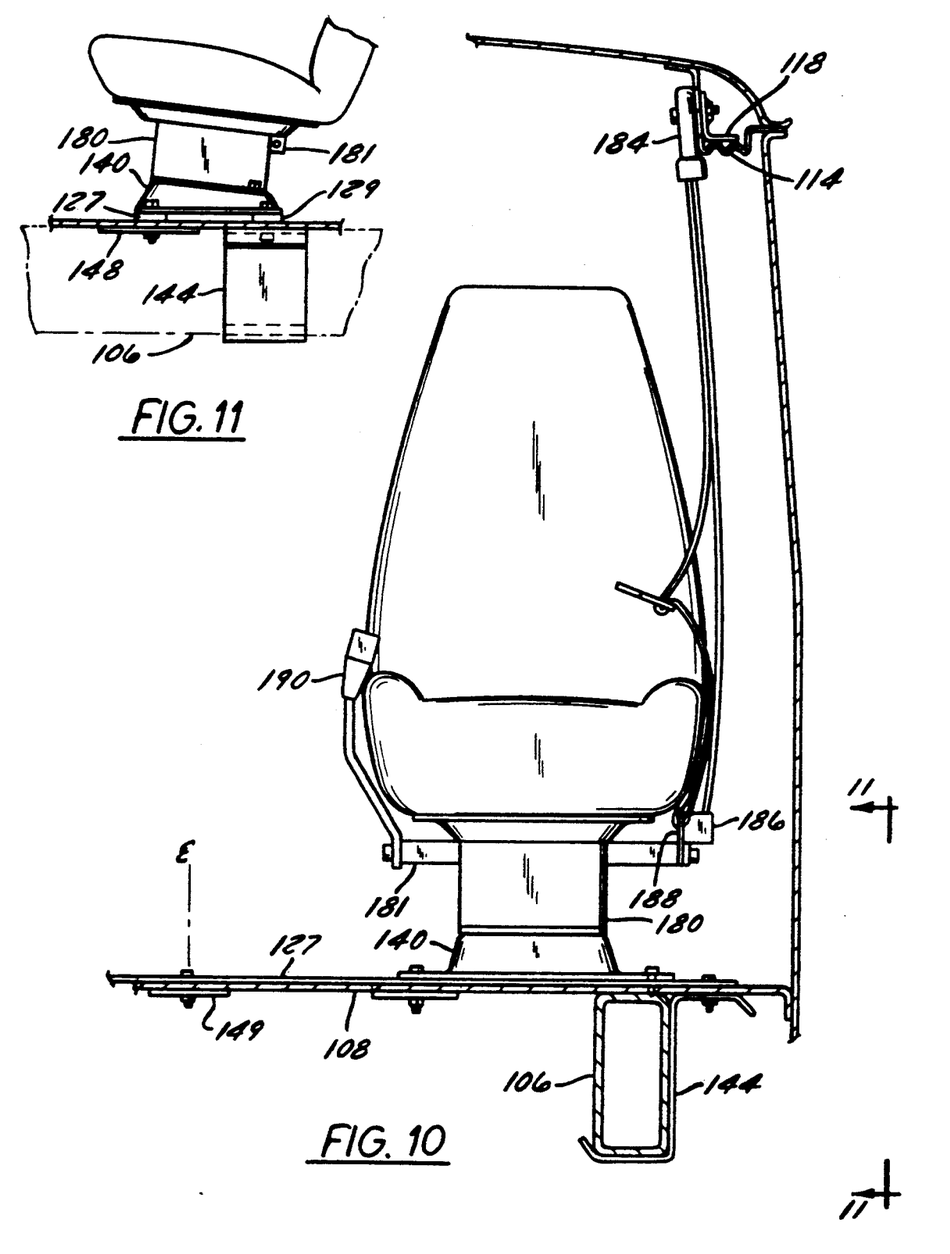
FIG. 10, is a partial sectional view of the left mid-section of the van shown in FIG. 7, showing the mid-position captain's chair on the driver's side of the vehicle.
FIG. 11, is a sectional view at line 11—11 of the FIG. 10.

At the mid-section of the van, a frame locking pedestal reinforcement member 144 is bolted from beneath the floor to the driver end of the rear pedestal bar 129 and another frame locking pedestal reinforcement member 146 is bolted from beneath the floor to the passenger end of the rear pedestal bar 129. Each frame locking pedestal reinforcement member 144 and 146 has an upper horizontal flat section with a bolt hole for attaching it to the rear pedestal bar 129, a vertical section which extends downward adjacent the chassis frame rail 106, and a lower horizontal section which wraps around the underside of the chassis frame rail. When force is applied to the seat belts on the captain's chairs, the pedestal frame locking reinforcement members 144 and 146 engage and lock against the chassis frame rails.

The front pedestal bar 127 is secured and reinforced against the floor 108 of the vehicle by three elongated metal front pedestal bar reinforcing plates located at the driver side outboard position 148, the center position 149, and the passenger side outboard position 150. The rear pedestal bar 129 is further secured and reinforced against the floor 108 of the vehicle by three elongated metal rear pedestal bar reinforcing plates, one each at the driver side outboard position 152, the center position 153, and the passenger outboard position 154.

At the rear section of the vehicle, a rear fenderwell reinforcement strap 136 is bolted to the driver side rear fenderwell and another fenderwell reinforcement strap 138 is bolted to the passenger side rear fenderwell. The fenderwell reinforcement straps may be attached either above or below the rear fenderwells. Also, an elongated flat metal front sofa reinforcement member 131 is bolted beneath the floor 108 adjacent the driver side chassis frame rail 106, and another member 133 on the passenger side, for securing the rear sofa to the floor of the van.

A pedestal base 140 is bolted to the front pedestal bar 127 and to the rear pedestal bar 129 at the driver side mid-position, and a pedestal base 142 is bolted to the front pedestal bar 127 and to the rear pedestal bar 129 at the passenger side mid-position. A seat pedestal 180 having a seat belt bar 181 mounted on the rear portion thereof is attached to pedestal base 140, and another seat pedestal 182 having a seat belt bar 183 mounted on the rear portion thereof is attached to pedestal base 142. Each seat belt bar 181 and 183 is effectively connected to the floor 108 by virtue of it being an integral part of a pedestal 180 and 182, which in turn is attached to a pedestal base 140 and 142, which in turn is bolted to the front and rear pedestal bars 127 and 129 on the floor.

Inside the rear portion of the vehicle, a harness L bracket 156 is bolted on top of the driver side rear fenderwell to the fenderwell reinforcement strap 136 underneath, and a harness L bracket 158 is bolted on the passenger side rear fenderwell to the fenderwell reinforcement strap 138 underneath.

The upper harness attachment 160 of the rear sofa outboard seat belt buckle assembly is attached to the upper harness attachment bolt bar 122 at the rear position of the driver side upper frame rail 114. The retractor assembly 162 and anchor plate 164 are bolted to the harness L bracket 156 on the driver side rear fenderwell. A rear seat belt buckle receptor 172 is bolted to the rear driver side inboard position of the sofa seat belt bar 134.

The upper harness attachment 166 of the passenger side rear sofa outboard seat belt assembly is attached to the upper harness attachment bolt bar 124 in the rear position of the passenger side upper frame rail 116. The retractor assembly 168 and anchor plate 170 are bolted to harness L bracket 158 located on the passenger side rear fenderwell. A seat belt buckle receptor 176 is bolted to the passenger side inboard position of the sofa seat belt bar 134. A center seat belt buckle 174 and a center seat belt buckle receptor 178 are also bolted to the inboard positions of the sofa seat belt bar 134.

For the driver side mid-position captain's chair, an upper harness attachment 184 is bolted to the upper harness bolt bar 118 in the mid-position of the driver side upper frame rail 114. The corresponding harness retractor 186 and anchor plate 188 are bolted to the outboard side of the pedestal-mounted seat belt bar 181 on the driver side mid-position pedestal 180. A buckle receptor 190 is bolted to the inboard side of the pedestal-mounted seat belt bar 181 of the driver side mid-position pedestal 180.

On the passenger side mid-position captain's chair, an upper harness attachment 192 is bolted to the upper harness attachment bolt bar 120 at the mid-position of the passenger side upper frame rail 116. The corresponding harness retractor 194 and anchor plate 196 are bolted to the outboard side of the pedestal-mounted seat belt bar 183 on the passenger side mid-position pedestal 182. A seat belt buckle receptor 198 is bolted to the inboard side of the pedestal-mounted seat belt bar 183 on the passenger side seat pedestal 182.

The seat belt anchorage system disclosed here was tested on a full size Chevrolet van and on a full size Ford van in accordance with FMVSS Standard Nos. 207 and 210. The loads were generated using hydraulic rams. The loads were applied through the seat belts to the seat belt anchorage system by using body block fixtures for the lap belts and torso block fixtures for the shoulder harnesses. The applied forces were measured with calibrated test gauges. The loads were generated by applying hydraulic pressure to create mechanical force until the required load was indicated on the test gauges. The captain's chairs and seat pedestals each weighed approximately 65 pounds, so at 20 times the weight, the load required under FMVSS Standard No. 207 was 1,280 pounds per chair. The sofa bench weighed approximately 120 pounds, so the load required was 2,420 pounds For a type 1 lap belt, FMVSS Standard No. 210 requires a load of 5,000 pounds. For a type 2 lap belt and shoulder harness combination, FMVSS Standard No. 210 requires a 3,000 pound load on the lap belt (body block) and a 3,000 pound load on the shoulder harness (torso block). Test procedures require the loads to be reached within a maximum of 30 seconds and be held for a minimum of 10 seconds.

During the tests, each mid-position captain's chair reached a load of 3,300 pounds on the torso block, 3,300 pounds on the body block, and 1,420 pounds against the seat, in a load time of 25 seconds and a hold time of 11 seconds. The seat belts for each outboard seat position for the rear sofa bench seats reached a load of 3,300 pounds for the torso block and 3,300 pounds for the body block. The center seat belt reached a load of 5,500 pounds. The force applied to the sofa seat reached a load of 2,662 pounds. The load time on the sofa seat positions was 25 seconds and the hold time was 11 seconds. Overall, the system withstood 37,402 pounds of force, over 18.7 tons.

The specific structural and functional details disclosed above are not to be interpreted as limiting, but merely as a basis for the claims and for teaching one skilled in the art to variously employ the present invention in any appropriately detailed structure. Changes may be made in the details of construction and arrangement of the invention without departing from the spirit of the invention, especially as defined in the following claims.

I claim:

1. A seat belt anchorage system for a conversion van comprising:
   an elongated upper harness attachment bolt bar with a bolt hole therein connected longitudinally along an upper frame rail of the van;
   a pedestal base installed on the floor of the van;
   an outboard reinforcing plate connected from beneath the floor to the outboard portion of the pedestal base and engaged underneath a protruding lip of a chassis frame rail of the van;
   an inboard reinforcing plate connected from beneath the floor to the inboard portion of the pedestal base;
   a seat pedestal with a seat belt bar thereon releasably attached to the pedestal base; and
   a seat belt assembly connected to the upper harness attachment bolt bar and to the seat belt bar on the seat pedestal.

2. A seat belt anchorage system for a conversion van comprising:
   an elongated upper harness attachment bolt bar with a bolt hole therein connected longitudinally along an upper frame rail of the van;
   a front pedestal bar extended end to end across the width of the floor of the mid-section of the van;
   a rear pedestal bar extended end to end across the width of the floor of the mid-section of the van;
   a pedestal base installed on the front and rear pedestal bars;
   first and second pedestal reinforcement connected members from beneath the floor to each end of the rear pedestal bar and connected to first and second portions, respectively, of a chassis frame rail of the van;
   a seat pedestal with a seat belt bar therein attached to the pedestal base; and
   a seat belt assembly connected to the upper harness attachment bolt bar and to the seat belt bar on the seat pedestal.

3. A seat belt anchorage system for a conversion van comprising:
   an elongated upper harness attachment bolt bar with a bolt hole therein connected to the upper frame rail of the van;
   a sofa seat belt bar extended end to end across the width of the floor at the rear of the van;
   first and second sofa reinforcement members connected from beneath the floor to each end of the sofa seat bolt bar and connected to first and second portions, respectively, of a chassis frame rail of the van with a portion of each reinforcement member wrapping around under the frame rail;
   a fenderwell reinforcement strap connected to a top and side of a rear fenderwell of the van; and a seat belt assembly connected to the upper harness attachment bolt bar, to the fenderwell reinforcement strap, and to the sofa seat belt bar.

4. A seat belt anchorage system for a conversion van comprising:

an elongated upper harness attachment bolt bar with a bolt hole therein attached longitudinally to the mid-position of the driver side upper frame rail of the van;

an elongated upper harness attachment bolt bar with a bolt hole therein attached longitudinally to the rear position of the driver side upper frame rail of the van;

an elongated upper harness attachment bolt bar with a bolt hole therein attached longitudinally to the mid-position of the passenger side upper frame rail of the van:

an elongated upper harness attachment bolt bar with a bolt hole therein attached longitudinally to the rear position of the passenger side upper frame rail of the van;

a sofa belt bar extended end to end across the floor at the rear of the van;

first sofa reinforcement member connected from beneath the floor to the driver end of the sofa belt bar and wrapped underneath the driver side chassis frame rail of the van;

a second sofa reinforcement member connected from beneath the floor to the passenger end of the sofa belt bar and wrapped underneath the passenger side chassis frame rail of the van;

a fenderwell reinforcement strap connected to a top and side of the driver side rear fenderwell of the van;

a fenderwell reinforcement strap connected to a top and side of the passenger side rear fenderwell of the van;

a first pedestal base installed on the driver side mid-position of the floor of the van;

a second pedestal base installed on the passenger side mid-position of the floor of the van;

an outboard reinforcing plate connected to the outboard portion of the driver side pedestal base and connected with an edge of the driver side chassis frame rail of the van;

an outboard reinforcing plate connected to the outboard portion of the passenger side pedestal base and connected with an edge of the passenger side chassis frame rail of the van;

inboard pedestal reinforcing plates connected from beneath the floor of the van to inboard portions of the driver side and passenger side pedestal bases;

a seat pedestal having a seat belt bar mounted thereon attached to the driver side pedestal base;

a seat pedestal having a seat belt bar mounted thereon attached to the passenger side pedestal base;

a seat belt and shoulder harness assembly connected to the upper harness attachment bolt bar at the mid-position of the driver side upper frame rail and to the pedestal-mounted seat belt bar on the driver side seat pedestal;

a seat belt and shoulder harness assembly connected to the upper harness attachment bolt bar at the mid-position of the passenger side upper frame rail and to the pedestal-mounted seat belt bar on the passenger side seat pedestal;

a seat belt and shoulder harness assembly connected to the upper harness attachment bolt bar at the rear position of the driver side upper frame rail, to the driver side fenderwell reinforcement strap, and to the sofa seat belt bar;

a seat belt and shoulder harness assembly connected to the upper harness attachment bolt bar at the rear position of the passenger side upper frame rail, to the passenger side fenderwell reinforcement strap, and to the sofa seat belt bar; and a rear center seat belt assembly connected to the sofa seat belt bar.

5. A seat belt anchorage system for a conversion van comprising:

an elongated upper harness attachment bolt bar attached longitudinally to the mid-position of the driver side upper frame rail of the van;

an elongated upper harness attachment bolt bar attached longitudinally to the rear position of the driver side upper frame rail of the van;

an elongated upper harness attachment bolt bar attached longitudinally to the mid-position of the passenger side upper frame rail of the van;

an elongated upper harness attachment bolt bar attached longitudinally to the rear position of the passenger side upper frame rail of the van;

a sofa seat belt bar extended end to end across a width of the floor at the rear of the van;

a first rear sofa reinforcement member connected from beneath the floor to the driver end of the sofa bolt bar and engaged underneath an extending lip of the driver side chassis frame rail of the van;

a second sofa reinforcement member connected from beneath the floor to the passenger end of the sofa belt bar and engaged underneath an extending lip of the passenger side chassis frame rail of the van;

a fenderwell reinforcement strap connected to a top and side of the driver side rear fenderwell of the van;

a fenderwell reinforcement strap connected to a top and side of the passenger side rear fenderwell of the van;

a front pedestal bar extended end to end across a width of the floor at the mid-position of the van;

a rear pedestal bar extended end to end across a width of the floor at the mid-position of the van;

a pedestal base installed on the front and rear pedestal bars at the driver side mid-position of the van;

a pedestal base installed on the front and rear pedestal bars at the passenger side mid-position of the van;

a first pedestal reinforcement member connected from beneath the floor to the driver end of the rear pedestal bar and connected to the driver side chassis frame rail of the van;

a second pedestal reinforcement member connected from beneath the floor to the passenger end of the rear pedestal bar and connected to the passenger side chassis frame rail of the van;

a seat pedestal having a seat belt bar mounted thereon attached to the driver side pedestal base;

a seat pedestal having a seat belt bar mounted thereon attached to the passenger side pedestal base;

a seat belt and shoulder harness assembly connected to the upper harness attachment bolt bar at the mid-position of the driver side upper frame rail and to the pedestal-mounted seat belt bar on the driver side seat pedestal;

a seat belt and shoulder harness assembly connected to the upper harness attachment bolt bar at the mid-position of the passenger side upper frame rail and to the pedestal-mounted seat belt bar on the passenger side seat pedestal;

a seat belt and shoulder harness assembly connected to the upper harness attachment bolt bar at the rear position of the driver side upper frame rail, to the driver side fenderwell reinforcement strap, and to the sofa seat belt bar;

a seat belt and shoulder harness assembly connected to the upper harness attachment bolt bar at the rear position of the passenger side upper frame rail, to the passenger side fenderwell reinforcement strap, and to the sofa seat belt bar; and a rear center seat belt assembly attached to the sofa seat belt bar.

6. A conversion van having seat belt anchorages comprising:

a rear sofa seat belt anchorage including a belt bar which extends end to end across the width of the floor of the van, with the belt bar being attached to brackets beneath the floor which wrap around underneath the chassis frame rails of the van;

a mid-position seat pedestal with a seat belt bar thereon attached to reinforcing plates beneath the floor which engage underneath a protruding lip of the chassis frame rail of the van;

a fender well reinforcement strap attached to a top and side portion of each rear fender well; and shoulder harness support members which extend along the upper frame rail of the van wherein a mid-position seat belt assembly is connected to the pedestal seat belt bar and to the shoulder harness member and wherein a rear seat belt assembly is fastened to the bolt bar, to the fender well reinforcement strap, and to the shoulder harness member.

7. A conversion van having a seat belt anchorage system for a mid-position pedestal seat in the van comprising:

an elongated upper harness attachment bolt bar with a bolt hole therein connected longitudinally to the upper frame rail of the van;

a pedestal base installed on the floor of the van;

an outboard reinforcing plate connected from beneath the floor to the outboard portion of the pedestal base and engaged underneath a protruding lip of the chassis frame rail of the van;

an inboard reinforcing plate connected from beneath the floor to the inboard portion of the pedestal base;

a seat pedestal with a seat belt bar thereon attached to the pedestal base; and a seat belt assembly connected to the upper harness attachment bolt bar and to the seat belt bar on the seat pedestal.

8. A conversion van having a seat belt anchorage system for a mid-position pedestal seat in the van comprising:

an elongated upper harness attachment bolt bar with a bolt hole therein connected longitudinally to the upper frame rail of the van;

a front pedestal bar extended across the width of the floor of the mid-section of the van;

a rear pedestal bar extended across the width of the floor of the mid-section of the van;

a pedestal base installed on the front and rear pedestal bars;

a pedestal reinforcement plate connected from beneath the floor to the rear pedestal bar and connected to the chassis frame rail of the van;

a seat pedestal with a seat belt bar therein attached to the pedestal base; and a seat belt assembly connected to the upper harness attachment bolt bar and to the seat belt bar on the seat pedestal.

9. A conversion van having a seat belt anchorage system for a rear outboard seat position in the van comprising:

an elongated upper harness attachment bolt bar with a bolt hole therein connected longitudinally to the upper frame rail of the van;

a sofa seat belt bar extended end to end across the floor at the rear of the van;

first and second sofa reinforcement members connected from beneath the floor to each end of the sofa seat belt bar and engaged with the first and second portion of chassis frame rail of the van, respectively, with a portion of each reinforcement member being wrapped underneath the frame rail;

a fenderwell reinforcement strap connected to the top and side of the rear fenderwell of the van; and a seat belt assembly connected to the upper harness attachment bolt bar, to the fenderwell reinforcement strap, and to the sofa seat belt bar.

10. A conversion van having a seat belt anchorage system comprising:

an elongated upper harness attachment bolt bar with a bolt hole therein attached longitudinally to the mid-position of the driver side upper frame rail of the van;

an elongated upper harness attachment bolt bar with a bolt hole therein attached longitudinally to the rear position of the driver side upper frame rail of the van;

an elongated upper harness attachment bolt bar with a bolt hole therein attached longitudinally to the mid-position of the passenger side upper frame rail of the van:

an elongated upper harness attachment bolt bar with a bolt hole therein attached longitudinally to the rear position of the passenger side upper frame rail of the van;

a sofa belt bar extended end to end across the floor at the rear of the van;

a first sofa reinforcement member connected from beneath the floor to the driver end of the sofa belt bar and engaged underneath the driver side chassis frame rail of the van;

a second sofa reinforcement member connected from beneath the floor to the passenger end of the sofa belt bar and engaged underneath the passenger side chassis frame rail of the van;

a fenderwell reinforcement strap connected to the top and side of the driver side rear fenderwell of the van;

a fenderwell reinforcement strap connected to the top and side of the passenger side rear fenderwell of the van;

a first pedestal base installed on the driver side mid-position of the floor of the van;

a second pedestal base installed on the passenger side mid-position of the floor of the van;

an outboard reinforcing plate connected to the outboard portion of the driver side pedestal base and engaged with a protruding edge of the driver side chassis frame rail of the van;

an outboard reinforcing plate connected to the outboard portion of the passenger side pedestal base and engaged with a protruding edge of the passenger side chassis frame rail of the van;

inboard reinforcing plates connected from beneath the floor of the van to inboard portions of the driver side and passenger side pedestal bases;

a seat pedestal having a seat belt bar mounted thereon attached to the driver side pedestal base;

a seat pedestal having a seat belt bar mounted thereon attached to the passenger side pedestal base;

a seat belt and shoulder harness assembly connected to the upper harness attachment bolt bar at the mid-position of the driver side upper frame rail and to the pedestal-mounted seat belt bar on the driver side seat pedestal;

a seat belt and shoulder harness assembly connected to the upper harness attachment bolt bar at the mid-position of the passenger side upper frame rail and to the pedestal-mounted seat belt base on the passenger side seat pedestal;

a seat belt and shoulder harness assembly connected to the upper harness attachment bolt bar at the rear position of the driver side upper frame rail, to the driver side fenderwell reinforcement strap, and to the sofa seat belt bar;

a seat belt and shoulder harness assembly connected to the upper harness attachment bolt bar at the rear position of the passenger side upper frame rail, to the passenger side fenderwell reinforcement strap, and to the sofa seat belt bar; and a rear center seat belt assembly connected to the sofa seat belt bar.

11. A conversion van having a seat belt anchorage system comprising:

an elongated upper harness attachment bolt bar attached longitudinally to the mid-position of the driver side upper frame rail of the van;

an elongated upper harness attachment bolt bar attached longitudinally to the rear position of the driver side upper frame rail of the van;

an elongated upper harness attachment bolt bar attached longitudinally to the mid-position of the passenger side upper frame rail of the van;

an elongated upper harness attachment bolt bar attached longitudinally to the rear position of the passenger side upper frame rail of the van;

a sofa belt bar extended end to end across the width of the floor at the rear of the van;

a first sofa reinforcement member connected from beneath the floor to the driver end of the sofa belt bar and engaged underneath a protruding lip of the driver side chassis frame rail of the van;

a sofa reinforcement member connected from beneath the floor to the passenger end of the sofa belt bar and engaged underneath a protruding lip of the passenger side chassis frame rail of the van;

a fenderwell reinforcement strap connected to the top and side of the driver side rear fenderwell of the van;

a fenderwell reinforcement strap connected to the top and side of the passenger side rear fenderwell of the van;

a front pedestal bar extended end to end across the width of the floor at the mid-position of the van;

a rear pedestal bar extended end to end across the width of the floor at the mid-position of the van;

a pedestal base installed on the front and rear pedestal bars at the driver side mid-position of the floor of the van;

a pedestal base installed on the front and rear pedestal bars at the passenger side mid-position of the floor of the van;

a first pedestal reinforcement member connected from beneath the floor to the driver end of the rear pedestal bar and connected underneath the drive side chassis frame rail of the van;

a second pedestal reinforcement member connected from beneath the floor to the passenger end of the rear pedestal bar and connected underneath the passenger side chassis frame rail of the van;

a seat pedestal having a seat belt bar mounted thereon attached to the driver side pedestal base;

a seat pedestal having a seat belt bar mounted thereon attached to the passenger side pedestal base;

a seat belt and shoulder harness assembly connected to the upper harness attachment bolt bar at the mid-position of the driver side upper frame rail and to the pedestal-mounted seat belt bar on the driver side seat pedestal;

a seat belt and shoulder harness assembly connected to the upper harness attachment bolt bar at the mid-position of the passenger side upper frame rail and to the pedestal-mounted seat belt base on the passenger side seat pedestal;

a seat belt and shoulder harness assembly connected to the upper harness attachment bolt bar at the rear position of the driver side upper frame rail, to the driver side fenderwell reinforcement strap, and to the sofa seat belt bar;

a seat belt and shoulder harness assembly connected to the upper harness attachment bolt bar at the rear position of the passenger side upper frame rail, to the passenger side fenderwell reinforcement strap, and to the sofa seat belt bar; and a rear center seat belt assembly connected to the sofa seat belt bar.

12. A method of installing a seat belt anchorage system in an incomplete conversion van comprising:

connecting an elongated upper harness attachment bolt bar longitudinally to the upper frame rail of the van;

installing a sofa seat side to side across the rear of the van;

extending a sofa seat belt bar end to end across the floor at the rear of the van behind the sofa seat;

connecting a sofa reinforcement member from beneath the floor to each side of the sofa seat and to each end of the sofa seat belt bar and engaging the reinforcement member underneath the chassis frame rail of the van;

connecting a fenderwell reinforcement strap to the top and side of the rear fenderwell of the van;

connecting a rear seat belt assembly to the upper harness attachment bolt bar to the fenderwell reinforcement strap, and to the sofa seat belt bar;

installing a pedestal base and a releasable pedestal with a seat belt bar thereon onto the mid-position of the floor of the van;

connecting a pedestal reinforcement member from beneath the floor of the van to the pedestal base and engaging the pedestal reinforcement member underneath the chassis from rail of the van; and connecting a mid-position seat belt assembly to the seat belt bar on the pedestal and to the upper harness attachment bolt bar.

13. A method of installing a seat belt anchorage system for a mid-position pedestal seat in an incomplete conversion van comprising:

connecting an elongated upper harness attachment bolt bar longitudinally to the upper frame rail of the van;

installing a pedestal base on the floor of the van;

connecting an outboard reinforcing plate from beneath the floor to the outboard portion of the pedestal base and engaging it with a protruding lip of the chassis frame rail;

connecting an inboard reinforcing plate from beneath the floor to the inboard portion of the pedestal base;

attaching a seat pedestal with a seat belt bar thereon to the pedestal base; and connecting a seat belt assembly to the upper harness attachment bolt bar and to the seat belt bar on the seat pedestal.

14. A method of installing a seat belt anchorage system for a rear outboard seat positions in an incomplete conversion van comprising:

connecting an elongated upper harness attachment bolt bar longitudinally to the upper frame rail of the van;

extending a sofa seat belt bar end to end across the floor at the rear of the van;

installing a sofa sea side to side across the rear of the van;

connecting first and second sofa reinforcement members from beneath the floor to each end of the sofa seat belt bar and wrapping the sofa reinforcement member around the chassis frame rail of the van;

connecting a fenderwell reinforcement strap to the top and sides of the rear fenderwell of the van; and connecting a seat belt assembly to the upper harness attachment bolt bar, to the fenderwell reinforcement strap, and to the sofa seat belt bar.

15. The method according to claim 12, wherein the reinforcement members are engaged with the chassis frame rail by wrapping the reinforcement members underneath the bottom of the frame rail.

16. The method according to claim 12, wherein the reinforcement members are engaged with the chassis frame rail by placing an edge of the reinforcement member underneath a protruding edge of the frame rail.

* * * * *